United States Patent [19]
Tanabe et al.

[11] Patent Number: 5,489,960
[45] Date of Patent: Feb. 6, 1996

[54] FOCAL PLANE SHUTTER DEVICE FOR A CAMERA

[75] Inventors: Yoshiaki Tanabe, Yokohama; Akira Katayama, Koganei; Masanori Hasuda, Yokohama, all of Japan

[73] Assignee: Nikon Corporation, Tokyo, Japan

[21] Appl. No.: 438,072

[22] Filed: May 8, 1995

Related U.S. Application Data

[63] Continuation of Ser. No. 305,654, Sep. 14, 1994, abandoned, which is a continuation-in-part of Ser. No. 162,968, Dec. 8, 1993, abandoned, which is a continuation of Ser. No. 787,089, Nov. 4, 1991, abandoned.

[30] Foreign Application Priority Data

Nov. 9, 1990 [JP] Japan ................................. 2-304691
Jun. 7, 1991 [JP] Japan ................................. 3-162452
Sep. 14, 1993 [JP] Japan ................................. 5-252511

[51] Int. Cl.$^6$ ................................................. G03B 9/32
[52] U.S. Cl. ........................... 354/242; 354/246; 354/247; 354/248
[58] Field of Search .................................. 354/241, 242, 354/245, 246, 247, 248

[56] References Cited

FOREIGN PATENT DOCUMENTS

| | | |
|---|---|---|
| 58-118627 | 7/1983 | Japan . |
| 59-62837 | 4/1984 | Japan . |
| 1-131538 | 5/1989 | Japan . |

Primary Examiner—Monroe H. Hayes
Attorney, Agent, or Firm—Shapiro and Shapiro

[57] ABSTRACT

A focal plane shutter device is provided in which when a rear shutter diaphragm travels in a first direction to retract from a photographing image plane from a state where the rear shutter diaphragm and a front shutter diaphragm shade the photographing image plane doubly, a balancer (42 and 44) travels in a direction which is substantially opposite to the first direction. When the front shutter diaphragm travels in a second direction opposite to the aforesaid first direction to begin exposure subsequent to the retraction of the rear shutter diaphragm, the aforesaid balancer (42 and 44) travels in a direction substantially opposite to the second direction. Consequently, it is possible to prevent camera blurring due to the traveling of the rear shutter diaphragm and the front shutter diaphragm by one balancer means. The device preferably includes an assisting member (45) which is connected to the balancer and which is caused to travel so as to provide a pressing force to assist the rear shutter diaphragm when the rear shutter diaphragm travels in the first direction, thus making it possible to perform the retraction of the rear shutter diaphragm more reliably. A chasing member may also be provided to chase the assisting member and secure a space between the front and rear shutter diaphragms by contacting the assisting member if, for example, the rear shutter diaphragm begins to travel prematurely by malfunction.

19 Claims, 7 Drawing Sheets

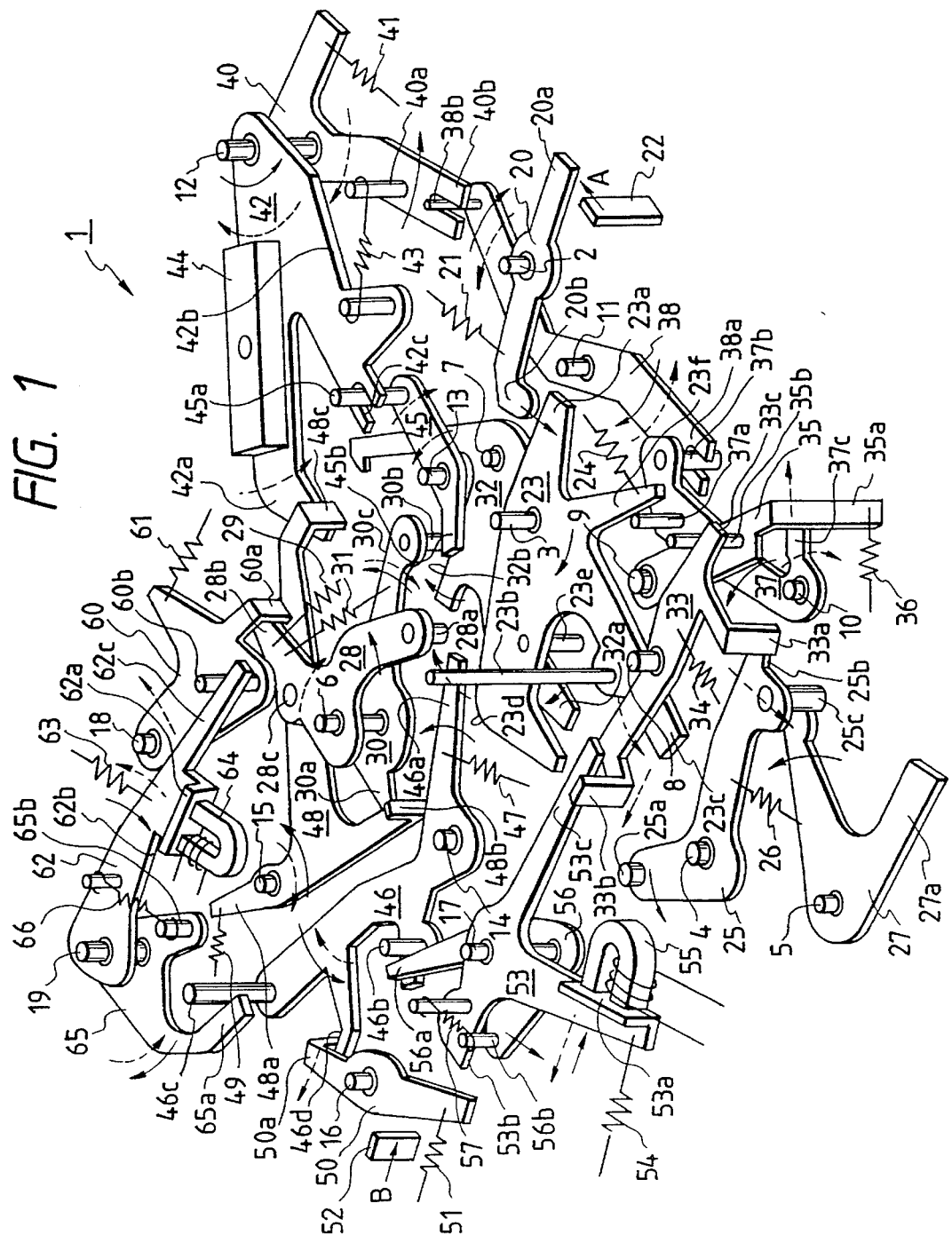

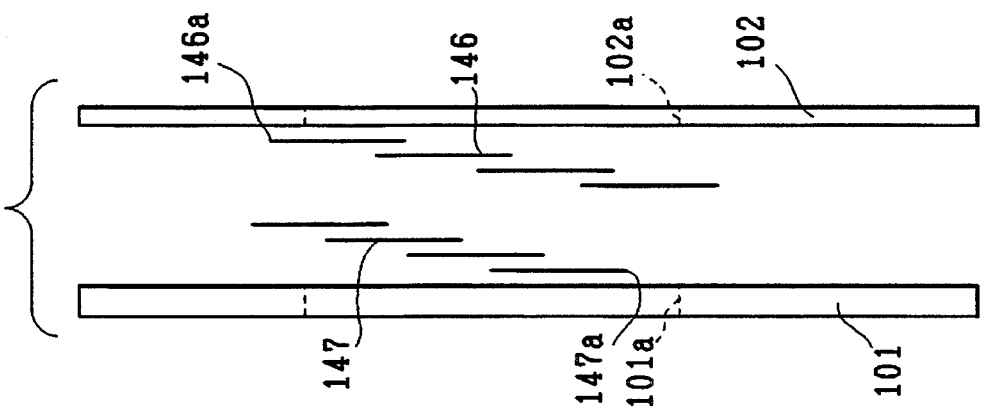
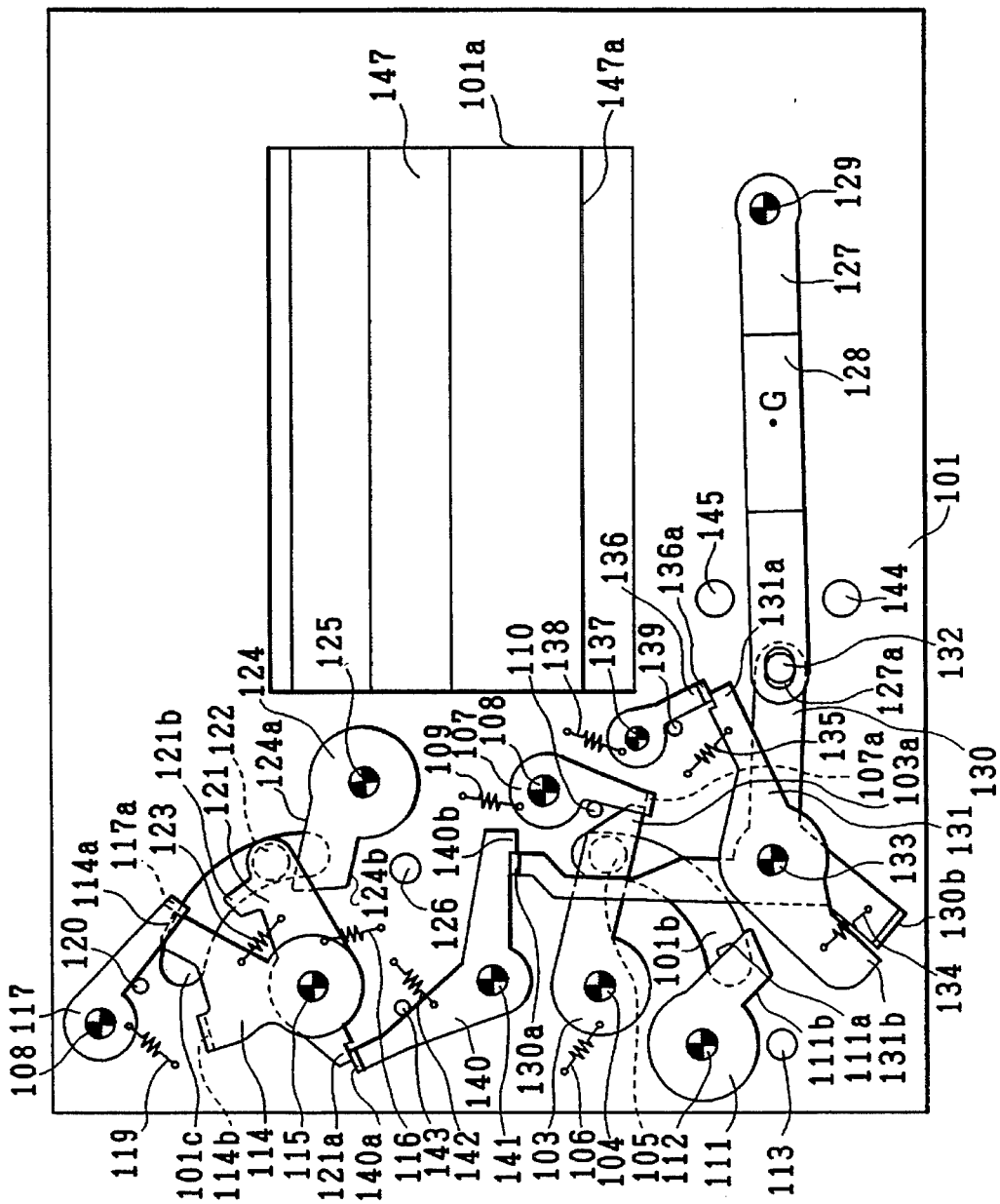
FIG. 2A
FIG. 2B

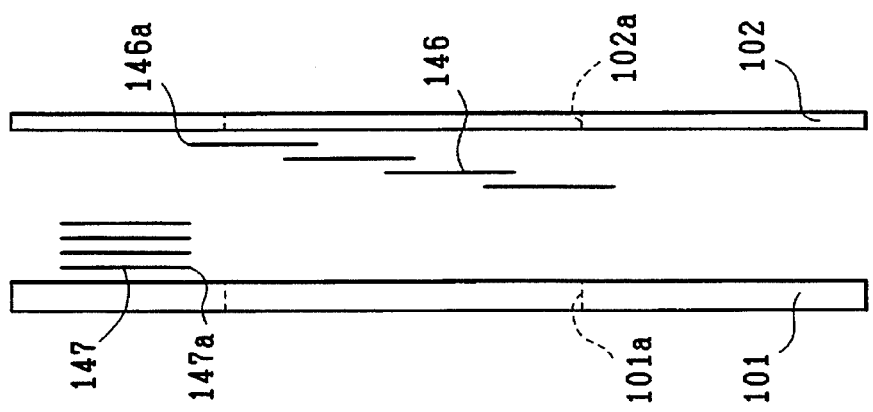
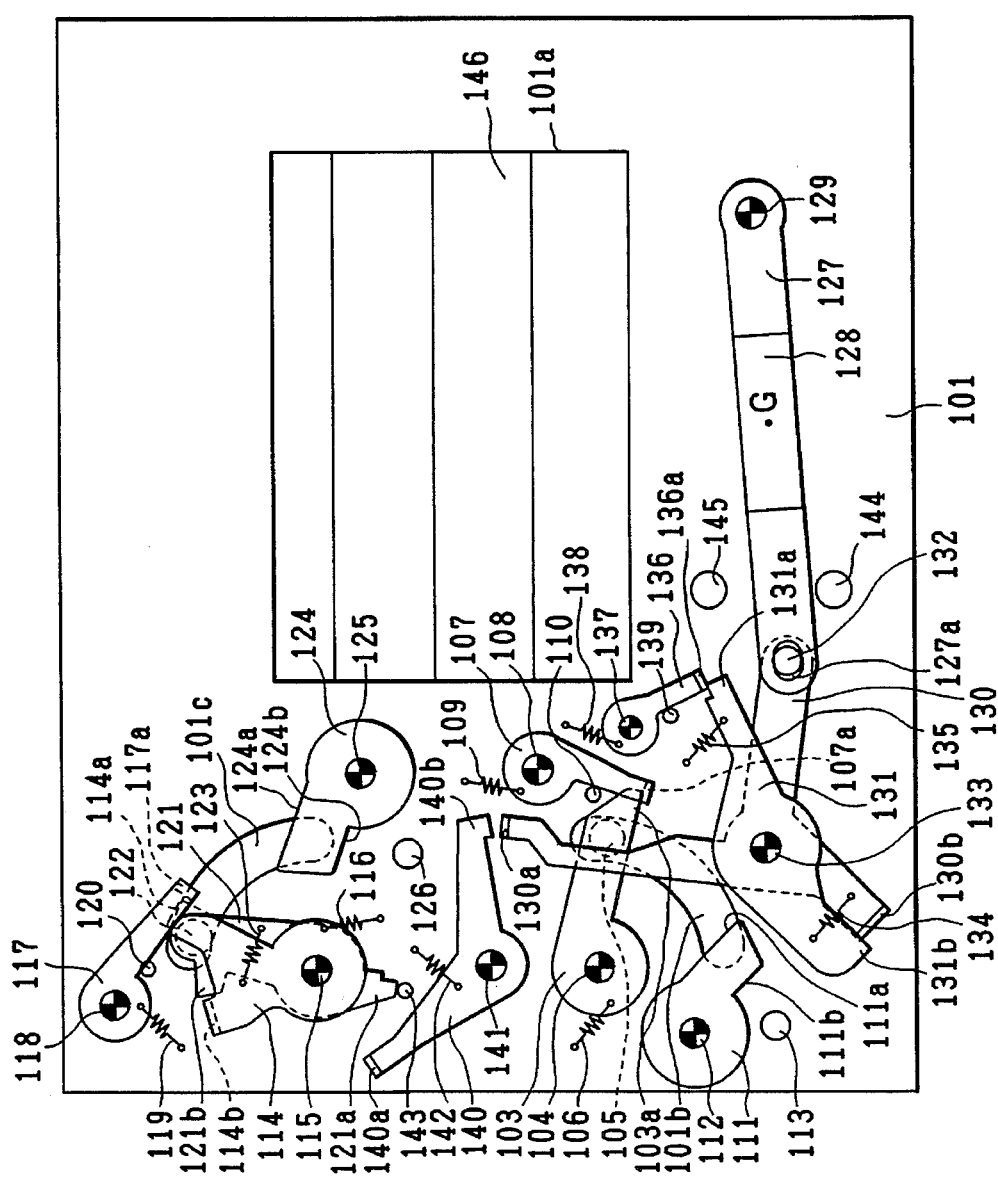

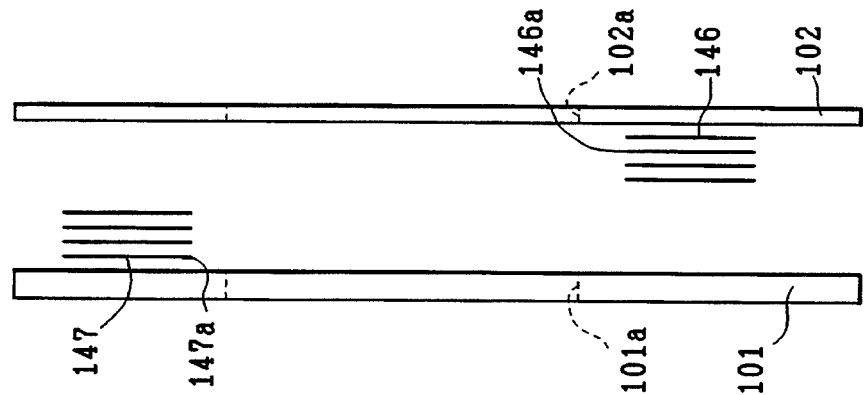
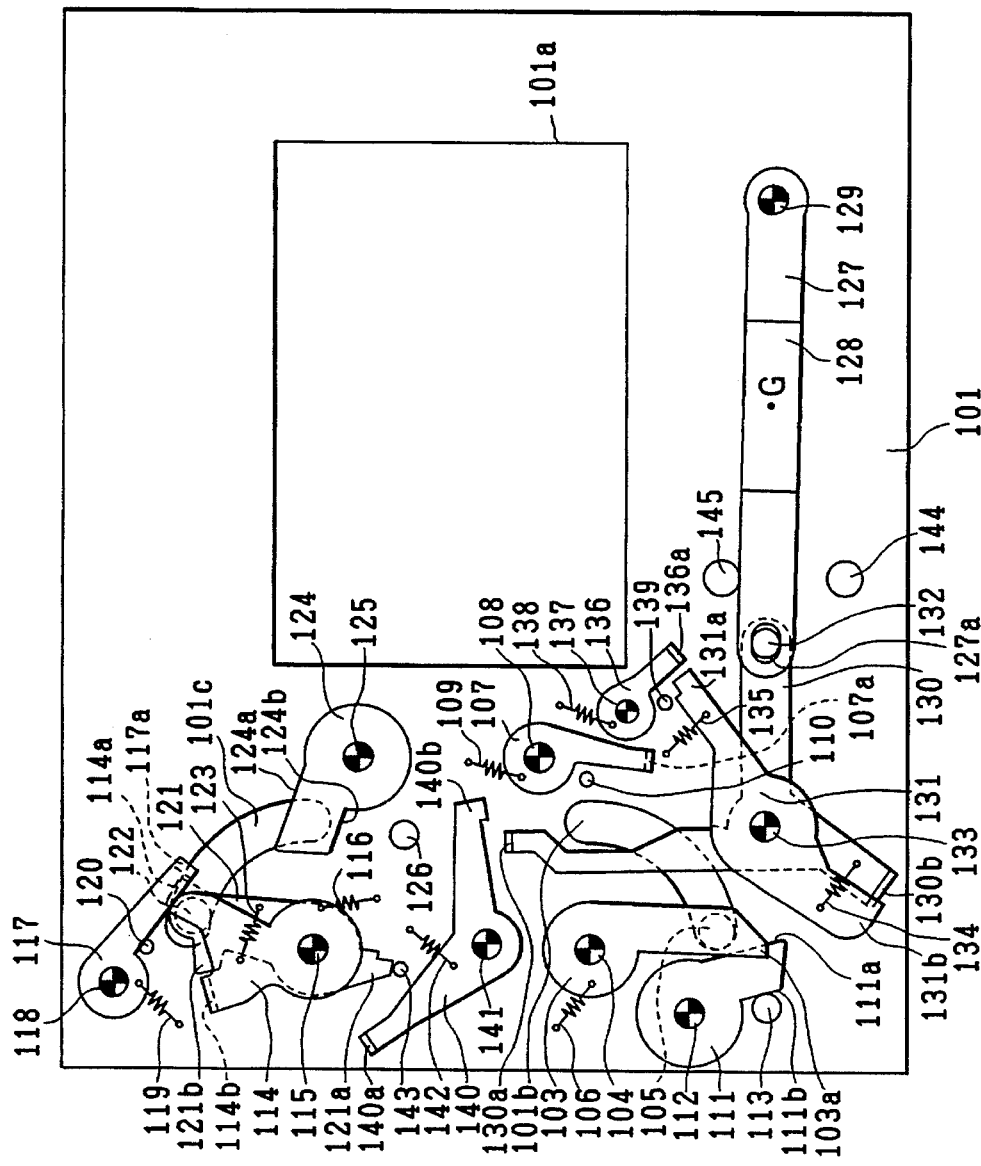
FIG. 4B
FIG. 4A

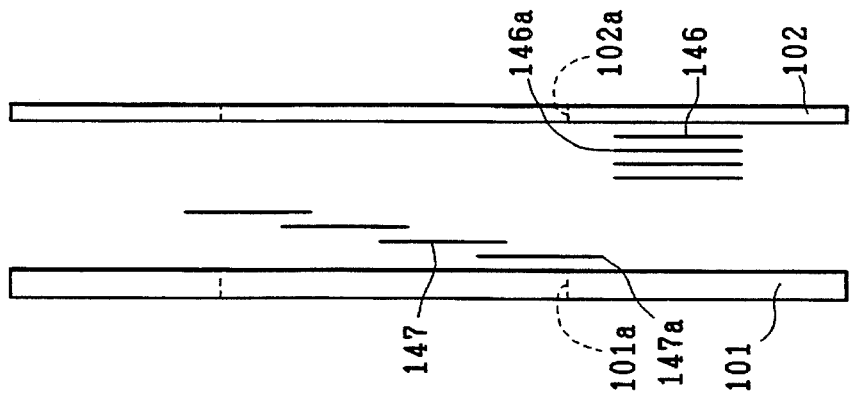
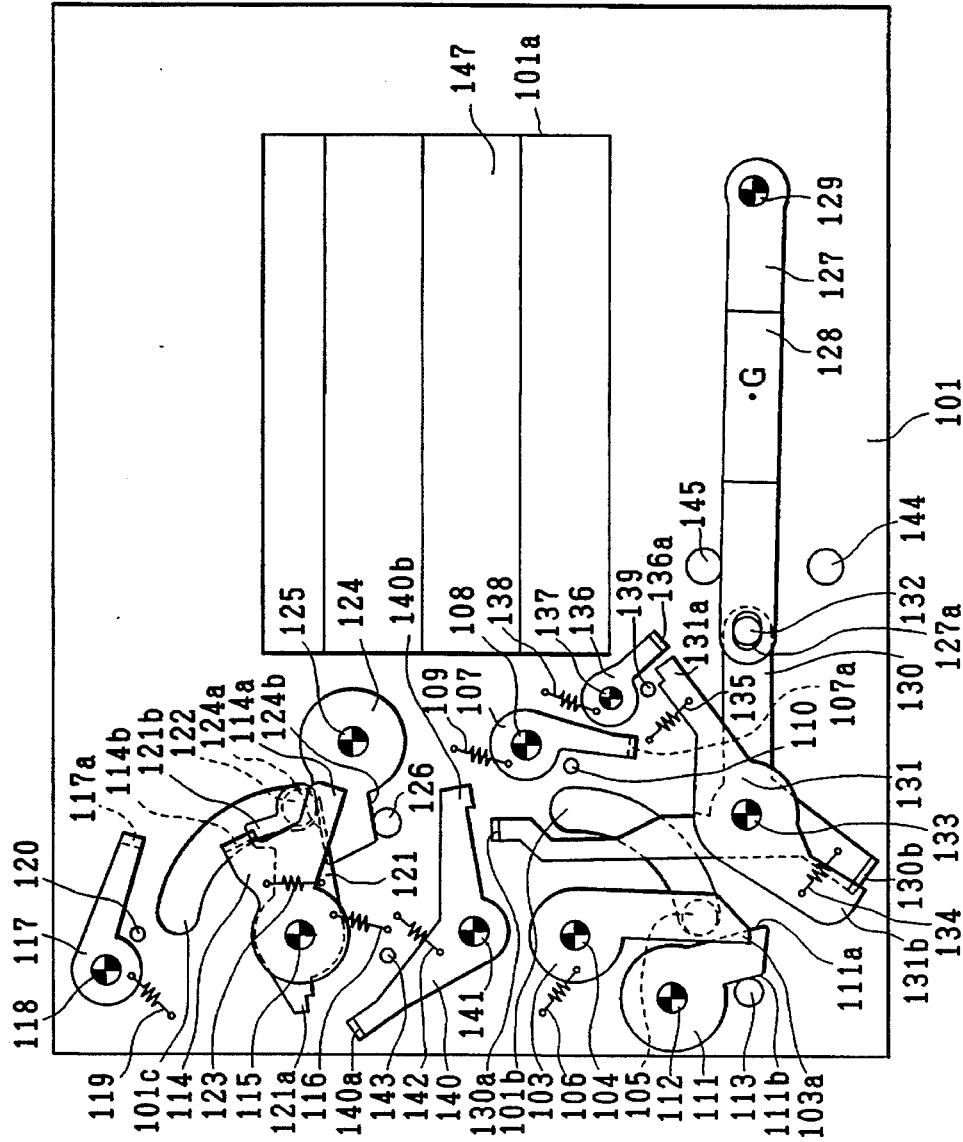
FIG. 5A
FIG. 5B

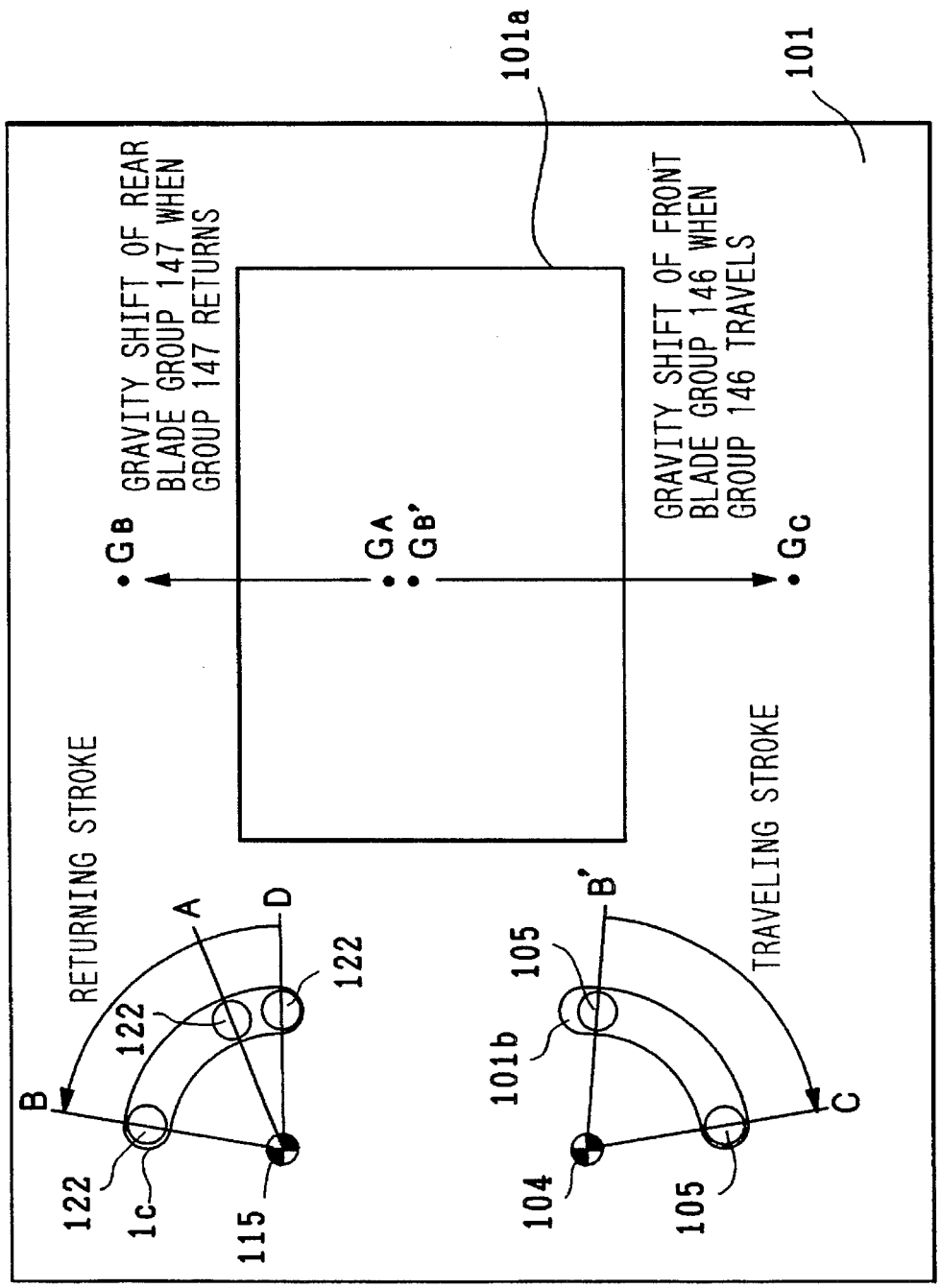

FOCAL PLANE SHUTTER DEVICE FOR A CAMERA

This is a continuation of application Ser. No. 08/305,654 filed Sep. 14, 1994, which is a continuation-in-part of application Ser. No. 08/162,968 filed Dec. 8, 1993, which is a continuation of application Ser. No. 07/787,089 filed Nov. 4, 1991, all now abandoned.

BACKGROUND OF THE INVENTION

1. Field of the Invention

The present invention relates to an improvement of the focal plane shutter device for a camera structured by a divisional blade type shutter.

2. Related Background Art

Traditionally, there have been proposed devices having various structures as focal plane shutter devices for a camera. As one of them, the so-called vertical movement type focal plane shutter device is known, in which the front and rear shutters formed with the blade groups each having a plurality of divided blades are sequentially driven to travel with a time difference on the photographing image plane with an aperture, so as to expos to the film plane through a slit produced between the blade groups.

For the focal plane shutter device mentioned above, it is necessary to prevent the camera body from being vibrated due to the reaction of the movement of the aforesaid shutter when the shutter is actuated to drive the front and rear blade groups. This is needed to avoid the so-called camera blurring. The causes of the vibration given to the camera body include those accompanying the mirror up operation and the like and the shock generated at the time of the shutter movement termination. Particularly, the latter, which is the shock following the shutter actuation, takes place during the exposure and produces an adverse effect as camera blurring on a picture to be taken. It is therefore desirable to soften or reduce this shock resulting from the shutter actuation as much as possible.

For this purpose, various preventive measures have been proposed. There is known a structure such as disclosed in U.S. Pat, No. 4,458,998, in which at least in a part of one of the driving systems for the two shading members, front and rear, formed by the shutter blinds or shutter blades, a balancer is movably provided as a balancing weight to offset the inertial effect by moving in the direction opposite to the movement of the corresponding shading member so as to soften the shock when the aforesaid shading member comes to a stop.

In a type of shutter such as disclosed in U.S. Pat. No. 4,657,366, the rear movement shading member is retracted from the photographing image plane just before the photographing, from the state where both the front and rear shading members shade the photographing image plane. Subsequently, an exposure is taken upon traveling of the front movement shading member. In this type of shutter, the camera blurring should be prevented when the rear movement shading member is retracted from the photographing image plane.

In this case, if balancer weights were provided for both of the front and rear shading members, the entire camera body would inevitably become larger. In addition, the material used for the balance is expensive.

Also, in a camera of such a type that the rear movement shading member is retracted before the photographing, making a means for giving a greater retracting thrust to the rear movement shading member in order to allow the rear movement shading member to be retracted reliably from the photographing image plane leads to making the camera body larger.

Furthermore, in a camera of a focal plane shutter type such as disclosed in U.S. Pat. No. 4,458,998 or U.S. Pat. No. 4,657,366, an imbalance can be generated in the traveling of the front and rear movement shading members due to a defective magnetic attraction or temperature changes, causing the width of a slit formed by the front movement shading member and rear movement shading member for exposure to be narrower, and there is a danger that an irregular exposure may occur.

In addition to the aforesaid measures traditionally taken for preventing vibration, there is known a focal plane shutter device capable of operating a vibro-prevention in such a manner that one balancer is caused to move in the direction opposite to the respective directions in which the shading member on the rear traveling side is returned to release the double shading state (that is, the state where both the shading members on the rear and front traveling sides shade the photographing image plane) after the shutter has been released, and the shading member on the front traveling side is subsequently allowed to travel for giving exposure. In this respect, the balancer reciprocates by this series of operations because the directions of the returning operation of the shading member on the rear traveling side and the traveling operation of the shading member on the front traveling side are opposite to each other.

However, in a shutter of a double shading type (the so-called double-shaded shutter, that is, in a focal plane shutter for a camera, the shutter aperture is shaded both by the shading member on the front traveling side and the shading member on the rear traveling side in a state where the charging is completed before starting an exposure) as disclosed in the specification of the aforesaid U.S. Pat. No. 4,657,366, the stroke of the returning operation of the shading member on the rear traveling side and the stroke of the traveling operation of the shading member on the front traveling side differ from each other (the returning stroke of the shading member on the rear traveling side is shorter) when the shutter is arranged to return the shading member on the rear traveling side to a position immediately before the brake is applied to it while in traveling in the double-shaded state in which the charging is completed. As a result, if only one balancer is simply allowed to reciprocate with a same stroke, a problem is still encountered that sufficient vibro-preventive effects cannot be obtained both for the traveling operation of the shading member on the front traveling side and the returning operation of the shading member on the rear traveling side. (An invention for solving this problem is referred to as second invention).

If, for example, a setting is made so that the vibro-preventive effect is optimized for the traveling operation of the shading member on the front traveling side, the vibro-preventive effect is produced excessively on the returning operation of the shading member on the rear traveling side. On the contrary, if a setting is made so that the vibro-preventive effect is optimized for the returning operation of the shading member on the rear traveling side, the vibro-preventive effect on the traveling operation of the shading member on the front traveling side becomes insufficient.

Also, even if the strokes of the returning operation of the shading member on the rear traveling side and the traveling operation of the shading member on the front traveling side are the same, there are some cases that the mass of one member is different from that of the other because the configuration and the materials to be used are different for the shading member on the front traveling side and the shading member on the rear traveling side. In this case, if the vibro-preventive effect is set to be optimal for the shading member on the rear traveling side or the shading member on the front traveling side, there is still a problem that the vibro-preventive effect on the other member becomes excessive or insufficient.

An invention for solving the above-mentioned problems is referred to as first invention.

SUMMARY OF THE INVENTION

A first object of the first invention is to provide a camera in which balancer means is effectively utilized.

A second object of the present invention is to achieve a focal plane shutter for a camera capable of preventing the camera blurring due to the retraction of the rear movement shading member and, at the same time, the camera blurring due to the traveling of the front movement shading member, without increasing the number of component parts or making the camera larger.

Further, a third object of the present invention is to provide a shutter capable of retracting the rear movement shading member from the photographing plane assuredly.

Also, a fourth object of the present invention is to provide a shutter capable of avoiding the occurrence of nonexposed image area in a photographing plane through an arrangement which secures a space between the front movement shading member and rear movement shading member.

According to the first invention, a balancer means is moved in the direction opposite to the retracting movement of the rear movement shading member by interlocking with the retracting operation of the rear movement shading member from the photographing image plane. In addition, the balancer means is moved in the direction opposite to the traveling direction of the front movement shading member by interlocking also with the traveling of the front movement shading member for an exposure. Consequently, it becomes possible to prevent such a trouble as the camera blurring due to the movements of both the shading members appropriately and reliably. Also, the camera blurring is prevented by the use of only one balancer means, so that the number of the camera parts is not increased.

Also, the members coupled to the balancer means press the rear movement shading member in operating the retraction of the rear movement member in order to enable the rear movement shading member to be retracted reliably from the photographing image plane. Therefore, the operation of the balancer means is not wasted at all.

Furthermore, even if the rear movement shading member catches up with the front movement shading member while in traveling, the aforesaid members are allowed to secure a space between the front movement shading member and rear movement shading member, thereby to make it possible to avoid the irregular exposure or nonexposed photographing.

In consideration of the above-mentioned problems, the second invention is designed for the prevention of vibrations associated with the traveling of the shading members on the rear and front traveling sides. It is an object of the invention to minimize such vibrations even when the returning operation of the shading member on the rear traveling side and the traveling operation of the shading member on the front traveling side generate the moments which differ from each other.

A focal plane shutter device for a camera is structured to return the shading member on the rear traveling side from the state that the photographing image plane is doubly shaded by the shading members on the rear and front traveling sides to the starting position for releasing the double-shaded state, and then, to start an exposure when the shading member on the front traveling side begins traveling, thus completing the exposure by allowing the shading member on the rear traveling side to travel after the elapse of a given period of time after the shading member on the front traveling side has begun traveling. In order to achieve the above-mentioned object in such a focal plane shutter device for a camera, the second invention comprises a mechanism for the shading member on the rear traveling side to retract; and a balancer means including a balancing weight so that this balancer means is interlocked with the returning operation of the shading member on the rear traveling side and the traveling operation of the shading member on the front traveling side to enable the reciprocation of the balancer means, and that the stroke of the balancer means is arranged to differ depending on whether it is interlocked with the returning operation of the shading member on the rear traveling side or with the traveling operation of the shading member on the front traveling side.

In a focal plane shutter device for a camera of the above-mentioned structure, the arrangement is made so that the stroke of the balancer means differs depending on whether it is interlocked with the returning operation of the shading member on the rear traveling side or with the traveling operation of the shading member on the front traveling side. Therefore, it is possible to maximize the prevention of the vibration associated with the traveling of the shading members on the front and rear traveling sides, respectively, by differentiating the strokes of the balancer means corresponding to the difference in the traveling moments exerted by the returning operation of the shading member on the rear traveling side and the traveling operation of the shading member on the front traveling side.

BRIEF DESCRIPTION OF THE DRAWINGS

FIG. 1 is a perspective view schematically showing the entire structure of an embodiment of a focal plane shutter device for a camera according to the first invention.

FIG. 2A is a plan view showing a second embodiment of a focal plane shutter device for a camera according to the second invention.

FIG. 2B is a side view showing the focal plane shutter device for a camera represented in FIG. 2A.

FIG. 3A is a plan view showing the second embodiment of a focal plane shutter device for a camera according to the second invention.

FIG. 3B is a side view showing the focal plane shutter device for a camera represented in FIG. 3A.

FIG. 4A is a plan view showing the second embodiment of a focal plane shutter device for a camera according to the second invention.

FIG. 4B is a side view showing the focal plane shutter device for a camera represented in FIG. 4A.

FIG. 5A is a plan view showing the second embodiment of a focal plane shutter device for a camera according to the second invention.

FIG. 5B is a side view showing the focal plane shutter device for a camera represented in FIG. 5A.

FIG. 6 is a front view showing the second embodiment of the focal plane shutter device according to the second invention.

DESCRIPTION OF THE PREFERRED EMBODIMENTS

Figure 7:
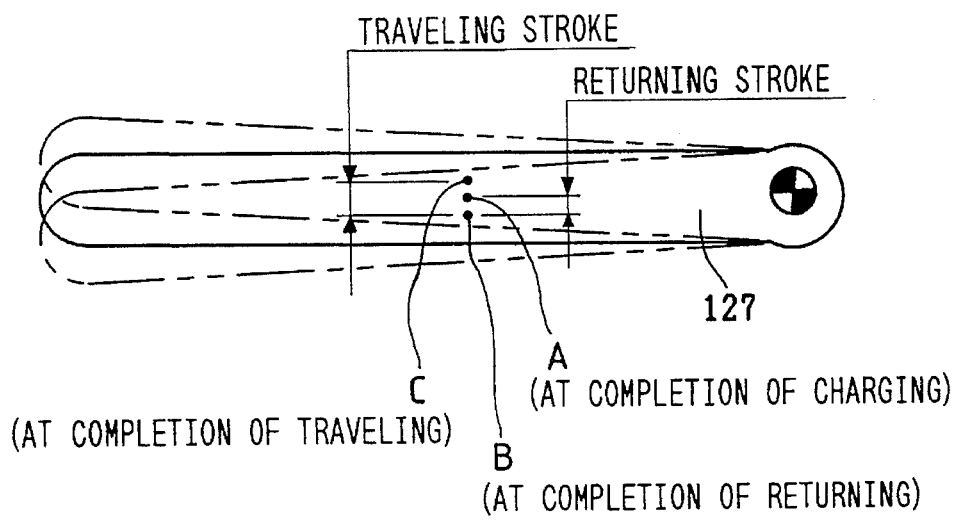
FIG. 7 is a front view showing the second embodiment of the focal plane shutter device according to the second invention.

FIG. 1 is a view illustrating an embodiment of a focal plane shutter device for a camera according to the first invention. In the present embodiment, the description will be made of the case where the present invention is applied to a known divisional blade type focal plane shutter device, namely, the so-called vertical movement type. In such device, a front blade group and rear blade group (both not shown), each formed by a respective plurality of shutter blades, are sequentially driven with a time difference in the direction perpendicular to the longitudinal direction of the shutter opening corresponding to a photographing image plane (aperture) for an exposure to be given on a film plane.

In FIG. 1, a reference numeral 1 designates a focal plane shutter device as a whole, comprising a plurality of driving lever mechanisms supported on a plurality of supporting shafts 2 through 19 mounted at appropriate positions on a shutter base (not shown). The shutter charging, returning movement of the shutter to a predetermined position as well as the shutter driving of the respective shutter blades and others can be performed appropriately by actuating the known divisional blade type shutter.

At first, the details of the driving lever mechanism are given below for the focal plane shutter device 1 according to the first invention.

In the form shown, a reference numeral 20 designates a charge lever rotatively supported on a shaft 2 on the shutter base (not shown) and is provided with a tension given by a spring 21 in the clockwise direction in FIG. 1. The structure is arranged so that the charge lever is charged against this tension in the anticlockwise direction in FIG. 1 by a lever 22 provided in the camera body. A reference numeral 23 designates a charge cam supported on a shaft 3 rotatively in the clockwise direction in FIG. 1 when the aforesaid charge lever 20 is rotated in the charging direction by the aforesaid lever 22 in the camera body, and the charge cam is provided with a tension by a spring 24 in the anticlockwise direction in FIG. 1.

A reference numeral 25 designates a front driving lever rotatively supported on a shaft 4 and is provided with a tension by a spring 26 in the clockwise direction in FIG. 1. This lever is structured to enable the known front blade group to be driven to move following the rotation thereof. A reference numeral 27 designates a brake lever which is rotatively supported on a shaft 5.

A reference numeral 28 designates a rear driving lever rotatively supported on a shaft 6 and provided with a tension by a spring 29 in the clockwise direction in FIG. 1. 30 designates a return lever which is rotatively supported on the same shaft 6 as the rear driving lever 28 and provided with a tension by a spring 31 tensioned between the return lever and the rear driving lever 28 in the anticlockwise direction in FIG. 1. This lever is in a double lever structure with the aforesaid rear driving lever 28 and is structured in such a manner that a part of this lever enables the known rear blade group to be returned or driven to move. A reference numeral 32 designates a brake lever which is rotatively supported on a shaft 7.

A reference numeral 33 designates a front key rotatively supported on a shaft 8 and provided with a tension by a spring 34 in the clockwise direction in FIG. 1. It is structured to enable the aforesaid front driving lever 25 to be stopped at a predetermined position.

A reference numeral 35 designates a balancer key rotatively supported on a shaft 9 and provided with a tension by a spring 36 in the clockwise direction in FIG. 1. The structure is arranged so that the movements of the aforesaid front key 33 and a transmission lever system for the balancer, which will be described later, can be controlled by this balancer key. 37 designates a balancer holding lever which is rotatively supported on a shaft 10; and 38, a transmission lever rotatively supported on a shaft 11 to constitute the transmission lever system for the balancer.

A reference numeral 40 designates a balancer driving lever rotatively supported on a shaft 12 and provided with a tension by a spring 41 in the clockwise direction in FIG. 1; and 42, a balancer lever rotatively supported on the same shaft 12 as the aforesaid balancer driving lever 40 and provided with a tension in the anticlockwise direction in FIG. 1 by a spring 43 tensioned between this lever and the balancer driving lever 40. This lever is arranged in a double structure with the aforesaid balancer driving lever 40, and a balancer 44 is mountably provided in a part thereof.

A reference numeral 45 designates a swing lever rotatively supported on a shaft 13 and structured to swing accompanying the movement of the aforesaid balancer lever 42 so that the movement of the aforesaid return lever 30 can be controlled.

A reference numeral 46 designates a magnet reset lever rotatively supported on a shaft 14 and, provided with a tension in the clockwise direction in FIG. 1 by a spring 47.

A reference numeral 48 designates a return stop lever rotatively supported on a shaft 15 and, provided with a tension in the anticlockwise direction in FIG. 1 by a spring 49. The structure is arranged so that the movements of the aforesaid balancer lever 42 and return lever 30 can be controlled.

A reference numeral 50 designates a reset lever key rotatively supported on a shaft 16 and provided with a tension by a spring 51 in the clockwise direction in FIG. 1. The structure is arranged in such a manner that its holding state with the aforesaid magnet reset lever 46 is released to obtain the reset state by the movement of the reset lever 52 in the camera body in the direction indicated by arrow B in FIG. 1.

A reference numeral 53 designates a front armature lever rotatively supported on a shaft 17 and provided with a tension by a spring 54 in the clockwise direction in FIG. 1. At the same time, the structure is arranged so that this lever is held in a state as shown in FIG. 1 when it is attracted by a front magnet 55 against the aforesaid tension, and is also arranged to enable this lever to be held by the aforesaid front key 33. 56 designates a front overcharge lever which is rotatively supported on the same shaft 17 as the aforesaid front armature lever 53 to construct a double lever structre and is which provided with a tension in the clockwise direction in FIG. 1 by a spring 57 tensioned between this lever and the aforesaid front armature lever 53. The structure is arranged to enable this lever to be coupled to the aforesaid magnet reset lever 46.

A reference numeral 60 designates a rear key rotatively supported on a shaft 18 and provided with a tension by a spring 61 in the clockwise direction in FIG. 1. The structure is arranged so that this key can be coupled to the rear driving lever 28.

A reference numeral 62 designates a rear armature lever rotatively supported on a shaft 19 and provided with a tension by a spring 63 in the anticlockwise direction in FIG. 1. The structure is arranged so that this lever is attracted by a rear magnet 64 against the aforesaid tension to be held therewith and is also arranged to enable this lever to be held by the aforesaid rear key 60. 65 designates a rear overcharge lever which is rotatively supported on the same shaft 19 as the aforesaid rear armature lever 62 to construct a double lever structure and which is provided with a tension in the anticlockwise direction in FIG. 1 by a spring 66 tensioned between this lever and the aforesaid rear armature lever 62. The structure is arranged to enable this lever to be coupled to the aforesaid magnet reset lever 46.

In the focal plane shutter device 1 according to the lever structure set forth above, the shutter charge is performed as given below.

When the lever 22 provided in the camera body is moved in the direction indicated by arrow A by a driving system in the camera body side, the description of which is omitted, the aforesaid lever 22 is in contact with one of the arms 20a of the charge lever 20 to cause it to be rotated in the anticlockwise direction in FIG. 1 against the tension exerted by the spring 21. Then, the other arm 20b of this charge lever 20 is allowed to be in contact with the arm 23a of the charge cam 23 to press it. Accordingly, the aforesaid cam 23 is rotated in the clockwise direction in FIG. 1.

As a result, with the clockwise rotation of this charge cam 23, the resetting of the magnet lever system is performed as given below.

In particular, because of this clockwise rotation of the charge cam 23, the pin 23b mounted on a part of the aforesaid cam 23 is caused to be in contact with the arm 46a of the magnet reset lever 46. Then, the aforesaid lever 46 is rotated in the anticlockwise direction against the tension exerted by the spring 47. With this anticlockwise rotation, the pin 46b fixed to the aforesaid lever 46 is caused to be in contact with the arm 56a of the front overcharge lever 56 to press it. Then, this lever is rotated. Thus, this front overcharge lever 56 is rotated anticlockwise, and as the lever is coupled to the front armature lever 53 by the tension of the spring 57, the front armature lever 53 is also rotated in the anticlockwise direction against the tension exerted by the spring 54. Here, the spring 57 has a tensioning force stronger than that of the spring 54.

Subsequently, when this front armature lever 53 is rotated in the anticlockwise direction to allow its attractive face 53a to be in contact with the front magnet 55, the aforesaid lever 53 is stopped as it is.

In the meantime, the other pin 46c fixed to the other end of the aforesaid magnet reset lever 46 is caused to be in contact with the arm 65a of the rear overcharge lever 65 to press it. Then, the rear overcharge lever 65 is rotated in the clockwise direction, and as the rear armature lever 62 is coupled thereto by the spring 66, the rear armature lever 62 is also rotated in the clockwise direction against the tension exerted by the spring 63. Here, the spring 66 has a tensioning force stronger than that of the spring 63.

Then, when this rear armature lever 62 is rotated in the clockwise direction to allow its attractive face 62a to be in contact with the rear magnet 64, the aforesaid lever 62 is stopped to maintain such a state as it is.

Further, even after these front and rear armature levers 53 and 62 are stopped, the abovementioned magnet reset lever 46 is still rotated in the anticlockwise direction against the tensions of the springs 57 and 66. Thus, this magnet reset lever 46 is rotated to a position where the other arm 46d thereof is held by the folding portion 50a of the reset lever key 50.

The arm 48a of the return holding lever 48, which has been in contact with the pin 46c, is rotated in the anticlockwise direction by the tension of the spring 49 when the above-mentioned magnet reset lever 46 is rotated in the anticlockwise direction. Then, the folding portions 48b and 48c are respectively rotated to the positions where the arm 30a of the return lever 30 and the arm 42a of the balancer lever 42 can be held and are stopped.

Now, in the resetting state of the magnetic system as described above, the front blade driving lever system is charged in the operation given below.

In particular, the other arm 23c presses the pin 25a fixed on the front driving lever 25 by the rotation of the aforesaid charge cam 23 in the clockwise direction. Thus, the front driving lever 25 is rotated in the anticlockwise direction against the tension of the spring 26 to move to a position where the folding section 33a of the front key 33 is held by the holding portion 25b. At this juncture, the pin 25c fixed on the front driving lever 25 causes the front brake 27 to be rotated in the anticlockwise direction for the resetting of the front brake 27.

In this respect, to this front brake 27, a friction is applied by a known method as resistance when it rotates around the supporting shaft 5.

Furthermore, to the pin 25c of the abovementioned mentioned front driving lever 25, the known front blade group is coupled, and the front blade group is arranged to enable the aperture, which is not shown in FIG. 1, to be closed when the blades are expanded by the rotation of the aforesaid front driving lever 25 in the anticlockwise direction.

Also, the rear blade driving system is charged in the operation given below.

When the charge cam 23 is rotated in the clockwise direction, the cam face 23d formed on a part thereof is in contact with the pin 28a of the rear driving lever 28 to press it. Then, the rear driving lever 28 is being rotated in the anticlockwise direction against the tension of the spring 29. At this juncture, by the function of the spring 31, the return lever 30 is also rotated in the anticlockwise direction. However, as this return lever 30 is at the position where the folding portion 48b of the return holding lever 48 can hold its arm 30a as described earlier, the rotation of the return lever is stopped when it is held by this portion. Thereafter, only the rear driving lever 28 is rotated in the anticlockwise direction. The rotation of this rear driving lever 28 is performed against the tensions of the springs 29 and 31 and is continued until its arm 28b is held by the folding portion 60a of the rear key 60.

The known rear blade group is coupled to the pin 30b fixed to the return lever 30 and the rear blade group is arranged to be stopped in a state where the blades are slightly folded by the rotation of the return lever 30 in the anticlockwise direction. In other words, by the return mechanism for the rear blade group formed by the return lever 30 and others, the group is returned to its starting position to maintain such a state in a standby condition for photographing to be performed. Also, the arm 32a of the rear brake 32 is in contact with the pin 23e of the charge cam 23, which allows the brake to be rotated in the clockwise direction for returning.

In this respect, to the rear brake 32, a friction is applied by the known method as resistance when the brake is rotated around the shaft 7.

The aforesaid rotation of the rear brake 32 in the clockwise direction is continued until it is stopped when the return lever 30 is held by the folding portion 48a of the return holding lever 48.

Also, the charging operation of the balancer system is performed as given below.

By the rotation of the aforesaid charge cam 23 in the clockwise direction, its arm 23f is in contact with the pin 37a fixed to the balancer holding lever 37 and presses it, so that the aforesaid balancer holding lever 37 is rotated in the anticlockwise direction. Also, as the fork portion 38a of the transmission lever 38 is coupled to the pin 37b fixed to the balancer holding lever 37, the transmission lever is rotated in the clockwise direction. Further, the fork portion 40a of the balancer driving lever 40 is coupled to the pin 38b fixed to the transmission lever 38, and the balancer driving lever is rotated in the anticlockwise direction against the tension of the spring 41.

Furthermore, since the balancer lever 42 is coupled to the balancer driving lever 40 by the tension of the spring 43, the balancer lever is rotated in the anticlockwise direction. However, as described earlier, the folding portion 48c of the return holding lever 48 is at a position where it can be coupled to the arm 42a, thereby to stop this anticlockwise rotation accordingly. Thereafter, only the balancer driving lever 40 is rotated in the anticlockwise direction against the tensions of the springs 41 and 43, and its rotation is stopped when the arm 37c of the aforesaid balancer holding lever 37 reaches the position where it is held by the folding portion 35a of the balancer key 35.

When the above-mentioned four charging operations are completed, the aforesaid lever 22 in the camera body is moved to return in the direction opposite to the direction indicated by arrow A whereby the charge lever 20 is rotated in the clockwise direction by the function of the spring 21. Further, the charge cam 23 is also rotated by the function of the spring 24 in the anticlockwise direction for returning.

The state of each part of the lever systems at the time of the completion of charging operations such as this corresponds to the state represented in FIG. 1, in which the movements of the respective parts set forth above are indicated by the arrows each shown in solid line in FIG. 1.

Now, the description will be made of the shutter operation subsequent to the completion of the above-mentioned charging.

When a shutter release button provided in the camera body, which is not shown in FIG. 1, is depressed, the front magnet 55 and rear magnet 64 are energized to attract the faces 53a and 62a of the respective levers 53 and 62 to be held attractively.

Then, the reset lever 52 incorporated in the camera body is shifted in the direction indicated by arrow B in FIG. 1, and this reset lever 52 causes the rest lever key 50 to be rotated in the anticlockwise direction against the tension of the spring 51. The engagement between the folding portion 50a and arm 46d is disengaged.

Thus, the magnet reset lever 46 is rotated in the clockwise direction in FIG. 1 by the function of the spring 47 as indicated by the arrow represented by a broken line, and when the pin 56b fixed to the front overcharge lever 56 is in contact with the side face 53b of the front armature lever 53, its rotation is stopped. Also, likewise, by the function of the spring 66, the rear overcharge lever 65 is rotated in the anticlockwise direction following the pin 46c of the aforesaid magnet reset lever 46, and when the pin 65b fixed to the rear overcharge lever 65 is in contact with the side face 62b of the rear armature lever 62, its rotation is stopped.

In the meantime, the magnet reset lever 46 is still rotated in the clockwise direction so that the pin 46c is in contact with the arm 48a to press it. Hence, the return holding lever 48 is rotated in the clockwise direction against the tension of the spring 49.

Then, the engagement between the holding portion 48b of the aforesaid lever 48 and the arm 30a as well as between the holding portion 48c and the arm 42a are disengaged almost simultaneously. Then, the return lever 30 begins rotating in the anticlockwise direction by the function of the spring 31 while the balancer 42 is also rotated in the anticlockwise direction by the function of the spring 43. At this juncture, the rear blade group (not shown) coupled to the pin 30b is folded to be retracted to the outside of the image plane. However, since the direction of this movement is opposite to the moving direction of the balancer 42, it is possible to prevent the camera blurring which may otherwise result from the returning motion of the rear blade group.

After the above-mentioned operation, when the side face 30c of the return lever 30 is in contact with the pin 28c fixed to the rear driving lever 28, the aforesaid return lever 30 is stopped. Also, when the side face 42b of the balancer 42 is in contact with the pin 40a fixed to the balancer driving lever 40, the balancer 42 is stopped.

As seen in FIG. 1 to the pin 45a of the swing lever 45, the fork portion 42c of the balancer 42 is coupled. Therefore the swing lever 45 is rotated in the clockwise direction by interlocking with the anticlockwise rotation of the aforesaid balancer 42. Here, the swing lever is caused to rotate following the movement of the pin 30b accompanying the aforesaid rotation of the return lever 30 because its arm 45b can be engaged with the pin 30b of the return lever 30.

Now, if the returning operation of the return lever 30 should be disturbed, the arm 45b functions to press the pin 30b in order to complement its returning motion to the starting position. In other words, this swing lever 45 is provided with a function to enable the rear blade group to perform its returning operation more reliably.

When the above-mentioned operation is completed, the front magnet 55 is de-energized, and the front armature lever 53 rotates in the clockwise direction by the function of the spring 54 as indicated by the arrow represented by the dashed line in FIG. 1. Then, its arm 53c presses the folding portion 33b of the front key 33 against the tension exerted by the spring 34. Thus, this front key 33 is caused to rotate in the anticlockwise direction, so that the engagement between the aforesaid folding portion 33a and the holding portion 25b is disengaged. As a result, the front driving lever 25 rotates in the clockwise direction by the tension exerted by the spring 26. At this juncture, the front blade group (not shown) coupled to the pin 25c of the front driving lever 25 is moved so as to open the photographing image plane to begin the exposure on the film plane, which is not shown in FIG. 1.

Almost at the same time that the engagement between the folding portion 33a and holding portion 25b is disengaged, the arm 33c presses the pint 35b fixed to the balancer key 35 to disengage the engagement between folding portion 35a and the arm 37c on the balancer holding lever 27 side against the tension exerted by the spring 36. Hence, the aforesaid balancer driving lever 40 connected to this balancer holding lever 37 through the transmission lever 38 is caused to rotate in the clockwise direction by the tension exerted by the spring 41.

At this juncture, the balancer 42 is pressed by the aforesaid pin 40a to rotate in the clockwise direction the same as balancer driving lever 40. Since the moving direction of the balancer driving lever 40 is opposite to the moving direction of the front blade group coupled to the pin 25c, it is possible to prevent the camera blurring due to the traveling of the front blade group.

As shown in FIG. 1 the pin 38b is connected to the fork portion 40b of the balancer driving lever 40. Accordingly, the transmission lever 38 rotates in the anticlockwise direction by interlocking with the clockwise rotation of the balancer driving lever 40, and at the same time, the balancer holding lever 37 is rotated in the clockwise direction because the fork portion 38a of the transmission lever 38 is coupled to the pin 37b.

On the other hand, the swing lever 45 is caused to rotate in the anticlockwise direction because of the rotation of the balancer 42 in the clockwise direction.

Also, after a predetermined time has elapsed subsequent to the de-energizing of the front magnet 55, the rear magnet 64 is de-energized. Then, the rear armature lever 62 is rotated in the anticlockwise direction by the tension exerted by the spring 63. Thus, the arm 62c presses the pin 60b fixed to the rear key 60. As a result, the rear key 60 is caused to rotate in the anticlockwise direction against the tension exerted by the spring 61 to disengage the engagement between its folding portion 60a and the arm 28b. Therefore, the rear driving lever 28 rotates in the clockwise direction by the tension exerted by the spring 29. Also, the return lever 30, being pressed by the pin 28c, rotates likewise in the clockwise direction.

Then, the rear blade group coupled to the pin 30b is expanded at this time so as to cover the photographing image plane to terminate the exposure. At this juncture, the front blade group has already moved and the arm 45b has traveled ahead of the pin 30b. Therefore, even if the holding of the rear key 60 should be released earlier while the camera is in use or a nonexposure photographing should be performed due to the defective attraction of the rear magnet 64, this arm 45b serves as a blocking element to prevent such a nonexposure photographing.

Towards the termination of the rotation of the front driving lever 25 in the clockwise direction, the pin 25c is in contact with the arm 27a of the front brake 27 to press it in the clockwise direction for braking the rotation of the front driving lever. Also, likewise, the clockwise rotation of the rear driving lever 28 is brought to a stop when the pin 30b is in contact with the side face 32b of the rear brake 32 to press it in the anticlockwise direction.

It is easily understandable that by the operations set forth above, a series of photographing actions at a time are completed.

Also, as clear from the above description, one balancer lever 42 is provided with a dual function as balancer means to serve at the time of the returning operation of the rear blade group to the starting position immediately before a photographing as well as of the traveling operation of the front blade group. As a result, it is unnecessary to increase the number of parts, and yet possible to produce an excellent effect with respect to preventing camera blurring due to shock, vibration, modified appropriately as required. Furthermore, while the description has been made of the application of the present invention to a vertical movement type divisional blade shutter in the above-mentioned embodiment, the application is not limited thereto, and the present invention is applicable, as a matter of course, to a lateral movement type focal plane shutter in which the front diaphragm and rear diaphragm travel sequentially as shutter diaphragms for exposure, for example. In this case, it is necessary to modify the lever transmission systems and lever shapes appropriately with respect to the positional relationship of the driving systems for the shutter diaphragms and the like. It suffices, however, if only the structures of the balancer lever 42 having the balancer 44, the balancer driving lever 40, and also the relations between these levers and the driving systems in each of the shutter diaphragm sides are arranged to meet the required conditions.

Hereinafter in conjunction with the accompanying drawings, the detailed description will be made of the embodiments according to the second invention.

FIGS. 2A and 3A are plan views showing a second embodiment of a focal plane shutter device for a camera according to the second invention. FIGS. 2B and 3B are side views showing such device, respectively. All the views illustrate the state where the charging is completed before starting an exposure.

In FIGS. 2A and 2B, an aperture 101a is arranged on a shutter base 101 for exposure. A driving lever 103 for the front blade group is mounted rotatively around a shaft 104 planted on the shutter base 101. This lever is biased by a driving spring 106 for the front blade group, one end of which is fixed to the shutter base 101, so that the lever can rotate in the clockwise direction. On the leading end of the driving lever 103 for the front blade group, a stopper 103a is formed.

A pin 105 for the front blade group, which is planted in the vicinity of the leading end of the driving lever 103 for the front blade group, is arranged to extend to the reverse side of the shutter base 101 through a crescent hole 101b made on the shutter base 101 to cover the rotational path of the pin 105 for the front blade group. Thus the pin is connected with the front blade group 146 comprising a plurality of divided shutter blades. The front blade group 146 is driven by the rotation of the driving lever 103 for the front blade group. In this respect, when the pin 105 for the front blade group 146 is in the position shown in FIG. 2A, the front blade group is spread out to cover the aperture 101a. This will be described further in conjunction with FIG. 2B.

On the leading end of a stopper key 107 for the front blade group, which is mounted rotatively around the shaft 108 planted on the shutter base 101, there is formed a stopper 107a which is folded toward the shutter base 101 side. The stopper key 107 for the front blade group is biased in the clockwise direction by a spring 109 fixed to the shutter base 101 at one end thereof. However, as shown in FIG. 2A, the rotation of the key is regulated by the pin 110. In the state where the stopper key 107 for the front blade group abuts upon the pin 110, the stopper 107a engages with the stopper 103a of the driving lever 103 for the front blade group, hence blocking the clockwise rotation of the driving lever 103 for the front blade group, which is actuated by the biasing force of the driving spring 106 for the front blade group. When the stopper key 107 for the front blade group rotates in the counterclockwise direction by overcoming the biasing force of the spring 109, the stoppers 107a and 103a are caused to disengage, and then, the driving lever 103 for the front blade group rotates in the clockwise direction by the biasing force of the driving spring 106 for the front blade group.

A brake lever 111 for the front blade group is mounted rotatively around a shaft 112 planted on the shutter base 101. FIG. 2A illustrates a state where this lever is reset. The brake lever 111 for the front blade group is structured so that resistance is exerted against the movement in the rotational direction by means of friction. The cam surface 111a of the brake lever 111 for the front blade group is arranged to face the interior of the rotational path of the pin 105 for the front blade group. After the pin 105 for the front blade group abuts on the cam surface 111a, this pin 105 pushes the brake lever 111 to exert resistance for braking in the vicinity of the terminating position with respect to the clockwise rotation of the pin 105 and driving lever 103 for the front blade group. The brake lever 111 for the front blade group is further pressed by the pin 105 for the front blade group so that it rotates in the clockwise direction. The clockwise rotation of the pin 105 and driving lever 103 for the front blade group is regulated by the position where the surface 111b of the brake lever abuts on the brake stopper 113 for the front blade group, which is planted on the shutter base 101. In this respect, when the pin 105 for the front blade group arrives at the position in which to regulate the rotation in the clockwise direction, the front blade group 146 is folded downward below the aperture 101a in order to release the aperture 101a.

A driving lever 114 for the rear blade group, which is mounted rotatively around a shaft 115 planted on the shutter base 101, is biased to rotate in the clockwise direction by a driving spring 116 for the rear blade group fixed to the shutter base 101 at one end. On the leading end of the driving lever 114 for the rear blade group, an abutting portion 114a is formed, and in the intermediate portion thereof, there is formed an abutting portion 114b which is folded toward the shutter base 101 side.

On the leading end of a stopper key 117 for the rear blade group, which is mounted rotatively around the shaft 118 planted on the shutter base 101, there is formed a stopper 117a which is folded toward the shutter base 101 side. The stopper key 117 for the rear blade group is biased in the clockwise direction by a spring 119 fixed to the shutter base 101 at one end thereof. However, as shown in FIG. 2A, the rotation of the key is regulated by the pin 120. In the state where the stopper key 117 for the rear blade group abuts upon the pin 120, the stopper 117a engages with the abutting portion 114a of the driving lever 114 for the rear blade group, hence blocking the clockwise rotation of the driving lever 114 for the rear blade group, which is actuated by the biasing force of the driving spring 116 for the rear blade group. When the stopper key 117 for the rear blade group rotates in the counterclockwise direction by overcoming the biasing force of the spring 119, the stopper 117a and the abutting portion 114a are caused to disengage, and then, the driving lever 114 for the rear blade group rotates in the clockwise direction by the biasing force of the driving spring 116 for the rear blade group.

On a lever 121 mounted rotatively around the shaft 118 together with the driving lever 114 for the rear blade group coaxially, abutting portions 121a and 121b are formed. In this respect, the lever 121 for the rear blade group is arranged between the shutter base 101 and the driving lever 114 for the rear blade group.

A pin 122 for the rear blade group, which is planted in the vicinity of the leading end of the driving lever 121 for the rear blade group, is arranged to extend to the reverse side of the shutter base 101 through a crescent hole 101c made on the shutter base 101 to cover the rotational path of the pin 122 for the rear blade group. Thus the pin is connected with the rear blade group 147 comprising a plurality of divided shutter blades. The rear blade group 147 is also driven by the rotation of the lever 121 for the rear blade group. In this respect, when the pin 122 for the rear blade group is in the position shown in FIG. 2A, the rear blade group 147 is in a state where it covers almost the entire aperture 101a with the exception of the lower part thereof. This will be described further in conjunction with FIG. 2B.

A returning operation spring 123 for the rear blade group, which is tensioned between the driving lever 114 for the rear blade group and the lever 121 for the rear blade group, is biased in the direction where the driving lever 114 and lever 121 for the rear blade group are integrated when the abutting portions 121a and 114a are in contact. In this respect, when the levers are integrated, and then, the driving lever 114 for the rear blade group is in the position shown in FIG. 2A, the rear blade group 147 is folded upward above the aperture 101a to release the aperture 101a.

A brake lever 124 for the rear blade group is mounted rotatively around a shaft 125 planted on the shutter base 101. FIG. 2A illustrates a state where this lever is reset. The brake lever 124 for the rear blade group is structured so that resistance is exerted against the movement in the rotational direction by means of friction. The cam surface 124a of the brake lever 124 for the rear blade group is arranged to face the interior of the rotational path of the pin 122 for the rear blade group. After the pin 122 for the rear blade group abuts on the cam surface 124a, this pin 122 pushes the brake lever 124 to exert resistance for braking in the vicinity of the terminating position with respect to the clockwise rotation of the pin 122 and driving lever 121 for the rear blade group. The brake lever 124 for the rear blade group is further pressed by the pin 122 for the rear blade group so that it rotates in the counterclockwise direction. The clockwise rotation of the pin 122 and lever 121 for the rear blade group is regulated by the position where the abutting surface 124b of the brake lever abuts on the brake stopper 126 for the rear blade group, which is planted on the shutter base 101. In this respect, when the pin 122 for the rear blade group arrives at the position in which to regulate the rotation in the clockwise direction, the rear blade group 147 is caused to spread to cover the aperture 101a.

A balancer 127 is mounted rotatively around a shaft 129 planted on the shutter base 101, and an elongated hole 127a is formed on the leading end thereof. The counterclockwise and clockwise rotations of the balancer lever 127 are regulated by a stopper 144 for the balancer returning operation, and a stopper 145 for the balancer travel planted on the shutter base 101, respectively. A balancing weight 128 is integrally mounted substantially in the center of a balancer lever 127. The structure is arranged to move its gravity G vertically (FIG. 2A) by the rotation of the balancer lever 127. The balancing weight is moved in the direction opposite to the direction in which the gravity of the front blade group 146 or the rear blade group 147 is caused to shift, while in synchronism (being interlocked) timing-wise; hence making it possible to obtain a vibro-preventive effect by offsetting the vibration to be generated by these shutter blade groups.

Three arms extending in three directions are provided for the lever 130 for the balancer returning operation, which is mounted rotatively around the shaft 133 planted on the shutter base 101, and on one of the extended arms, there is formed a stopper 130a folded to the side opposite to the shutter base 101. On another extended arm, an abutting portion 130b which is folded to the side opposite to the shutter base 101, is formed. On the remaining arm, a connecting pin 132 is mounted. In this respect, the connecting pin 132 is slidably fitted into the elongated hole 127a of the balancer 127. In this way, the balancer lever 127 and the lever 130 for the balancer returning operation are arranged to be interlocked in operation. In other words, when the lever 130 for the balancer returning operation rotates in the clockwise direction, the balancer lever 127 rotates in the counterclockwise direction: these two levers are also interlocked when actuated in the opposite direction to it.

On one end of the lever 131 for balancer travel rotatively mounted together with the lever 130 for balancer returning operation coaxially around the shaft 133, a stopper 131a is formed. On the other end thereof, an abutting portion 131b is formed, which is folded in the direction opposite to the shutter base 101. Further, this lever is biased in the counterclockwise direction by a spring 135 for balancer travel one end of which is fixed to the shutter base 101. In this respect, the lever 130 for balancer returning operation is arranged between the shutter base 101 and the lever 131 for balancer travel.

The spring 134 for balancer returning operation is tensioned between the lever 130 for balancer returning operation and the lever 131 for balancer travel to cause the abutting portions 130b and 131b to be in contact so that the lever 130 for balancer returning operation and the lever 131 for balancer travel are biased in the direction in which these levers are unified.

On the leading end of a suspension lever 136 for balancer travel mounted rotatively around a shaft 137 planted on the shutter base 101, there is formed a stopper 136a folded in the direction opposite to the shutter base 101. Also, this lever is biased to rotate in the clockwise direction by a spring 138 the one end of which is fixed to the shutter base 101. Such rotation is regulated by a pin 139 as shown in FIG. 2A. In a state where the suspension lever 136 for balancer travel abuts upon the pin 139, the stopper 136a engages with the stopper 131a of the lever 131 for balancer travel to suspend the counterclockwise rotation of the lever 131 for balancer travel actuated by the biasing force of the spring 135 for balancer travel. The suspension lever 136 for balancer travel rotates in the counterclockwise direction by overcoming the biasing force of the spring 138 to release the engagement of the stoppers 136a and 131a, and then, the lever 131 for balancer travel rotates in the counterclockwise direction by the biasing force of the spring 135 for balancer travel.

On one end of a lever 140 for returning operation suspension mounted rotatively around a shaft 141 planted on the shutter base 101, there is formed a stopper 140b folded in the direction opposite to the shutter base 101. On the other end thereof, a stopper 140a is formed. The lever 140 for returning operation suspension is biased to rotate in the clockwise direction by a spring 142 the one end of which is fixed to the shutter base 101. Such rotation is regulated by a pin 143 as shown in FIG. 2A. In a state where the lever for returning operation suspension abuts upon the pin 143, the stoppers 140a and 140b engage with the abutting portion 121a of the lever 121 for rear blade group and the stopper 130a of the lever 130 for balancer returning operation, respectively, to suspend the counterclockwise rotation of the lever 121 for rear blade group actuated by the spring 123 for the rear blade group returning operation, and the clockwise rotation of the lever 130 for balancer returning operation actuated by the spring 134 for balancer returning operation.

The lever 140 for returning operation suspension rotates in the counterclockwise direction by overcoming the biasing force of the spring 142 to release the engagement between the stopper 140a and abutting portion 121a, and the engagement between stoppers 140b and 130a, respectively, and then, the lever 121 for rear blade group rotates in the counterclockwise direction by the biasing force of the spring 123 for rear blade group returning operation, while the lever 130 for balancer returning operation rotates in the clockwise direction by the biasing force of the spring 134 for balancer returning operation.

The coupling relationship between the abutting portion 121a and stopper 140a is determined to set the lever 121 for rear blade group in a position where the pin 122 for rear blade group does not abut upon the cam surface 124a when the brake lever 124 is rest for the rear blade group.

In FIG. 2B, an aperture 102a is arranged for a cover plate 102 (not shown in FIG. 2A) in the same manner as the aperture 101a on the shutter base 101. Also, reference numerals 146 and 147 designate the front blade group and rear blade group, respectively; and 146a and 147a, the respective slit edges. In a state that the charging is complete as in FIG. 2B, the front blade group covers the apertures 101a and 102a as described earlier, but the slit edge 147a of the rear blade group is positioned in the lower part in the apertures 101a and 102a. Therefore, the apertures 101a and 102a are slightly released.

In this respect, since the front and rear blade groups are of the same structure, the equivalent mass of these groups is substantially the same. The vibration is generated almost in proportion to the equivalent mass.

So far the description has been made of the structure of the principal part of the shutter device according to the second invention. Now, the shutter operation will be described according to the second invention.

When the release button of a camera is depressed, the mirror and diaphragm mechanisms are actuated. Then, almost simultaneously, from the state illustrated in FIGS. 2A and 2B, the lever 140 for returning operation suspension rotates at first by means of a releasing mechanism (not shown) in the counterclockwise direction by overcoming the biasing force of the spring 142. The engagement between the stopper 140a and abutting portion 121a, and the engagement between stoppers 140b and 130a are released. The lever 121 for rear blade group rotates in the counterclockwise direction by the biasing force of the spring 123 for rear blade group returning operation, while the abutting portion 121b is in contact with the abutting portion 114b of the lever 114 for rear blade group. Therefore, the rear blade group 147 coupled with the pin 122 for rear blade group is allowed to shift upward for returning operation, thus being folded upward to the aperture 101a. This group returns to the starting position. The aperture 101a is in a released state.

On the other hand, substantially at the same time that the rear blade group starts retracting, the lever 130 for balancer returning operation begins rotating in the clockwise direction by the biasing force of the spring 134 for balancer returning operation. Consequently, the balancer lever 127 and the balancing weight 128 connected by the connecting pin 132 rotate in the counterclockwise direction. As a result, the gravity G of the balancing weight 128 begins its shift downward (FIG. 2A). Almost at the same time that the returning operation of the rear blade group 147 is completed, the abutting portion 130b is in contact with the abutting portion 131b of the lever 131 for balancer travel. Thus the rotation of the lever 130 for balancer returning operation is suspended. Likewise the downward shift of the balancing weight 128 is suspended. In this way, substantially in synchronism (interlocked) with the returning operation of the rear blade group 147, the balancing weight 128 shifts in the direction opposite to it, thus offsetting the vibration generated by the returning operation of the rear blade group 147.

FIGS. 3A and 3B illustrate a state just before an exposure is started subsequent to the completion of the above-mentioned operation. In this respect, the balancer lever 127 does not abut on the stopper 144 for balancer returning operation at this juncture. This is due to the structure arranged in such a way that the position of the lever 130 for balancer returning operation is determined by means of the lever 131 for balancer travel which is suspended by the suspension lever 136 for balancer travel, and then, the position of the balancer lever 127 is further determined accordingly. However, it is the spring 135 for balancer travel that absorbs the shock when the counterclockwise rotation of the balancer lever 127 is suspended. Therefore, the stopper 144 for balancer returning operation is arranged to regulate any overrun that may take place by the balancer lever 127.

From the state illustrated in FIGS. 3A and 3B, the suspension key 107 for front blade group rotates by a mechanism (not shown) in the counterclockwise direction by overcoming the biasing force of the spring 109, thus releasing the engagement between the stopper 107a and the stopper 103a of the front blade group 103. Also, the suspension lever 136 for balancer travel rotates in the counterclockwise direction by overcoming the biasing force of the spring 138, thus releasing the engagement between the stopper 136a and the stopper 131a of the lever 131 for balancer travel. Then the driving lever 103 for front blade group starts rotating in the clockwise direction by the biasing force of the driving spring 106 for front blade group. Then the front blade group 146 connected with the pin 105 for front blade group starts shifting downward (FIG. 3A) for traveling. Hence, the aperture 101a begins to be released for starting an exposure. When the pin 105 for front blade group rotates to the position where it abuts upon the cam surface 111a of the brake lever 111 for front blade group, a resisting force is exerted by the brake lever 111 for front blade group on the pin 105 for front blade group and the driving lever 103 for front blade group to apply a brake. Thus, in a position where the abutting surface 111b is in contact with the brake stopper 113 for front blade group, the pin 105 and driving lever 103 for front blade group are suspended to complete the traveling operation of the front blade group 146. At this juncture, the front blade group 146 are folded downward to the aperture 101a. The aperture 101a is in a state of being released.

On the other hand, almost at the same time that the front blade group 146 starts traveling, the lever 131 for balancer travel starts rotating in the counterclockwise direction. Here, the abutting portion 130b of the lever 130 for balancer returning operation remain to be in contact with the abutting portion 131b due to the biasing force of the spring 134 for balancer returning operation. In other words, the lever 130 for balancer returning operation and the lever 131 for balancer travel are integrated and start rotating in the counterclockwise direction. Then the balancer lever 127 also begins rotating in the clockwise direction. As a result, the balancing weight 128 starts shifting itself upward (FIG. 3A). Almost at the same time that the traveling operation of the front blade group 146 is completed, the balancer lever 127 abuts upon the stopper 145 for balancer travel and suspended. The balancing weight 128 also suspends its upward shift (FIG. 3A). Then the lever 130 for balancer returning operation and the lever 131 for balancer travel are suspended, too. In this way, almost in synchronism (interlocked) with the traveling operation of the front blade group 146, the balancing weight 128 shifts in the direction opposite to it, hence offsetting the vibration generated by the traveling operation of the front blade group 146.

FIGS. 4A and 4B illustrate the state where the traveling operation of the front blade group 146 is completed. From this state in FIGS. 4A and 4B, the suspension key 117 for rear blade group rotates by means of a mechanism (not shown) in the counterclockwise direction by overcoming the biasing force of the spring 119, thus releasing the engagement between the stopper 117a and the abutting portion 114a. Then the driving lever 114 for rear blade group starts rotating in the clockwise direction by the biasing force of the driving spring 116 for rear blade group. Here, while the abutting portion 121b remains to be in contact with the abutting portion 114b by the biasing force of the spring 123 for rear blade returning operation group, the lever 121 for rear blade group is integrated with the driving lever 114 for rear blade group, and starts rotating in the clockwise direction. Therefore, the rear blade group 147 connected with the pin 122 for rear blade group starts its traveling operation thereby to shift it downward (FIG. 4A). In this way, the rear blade group 147 begins covering the aperture 101a. When the pin 122 for rear blade group rotates to the position where it abuts upon the cam surface 124a of the brake lever 124 for rear blade group, a resisting force is exerted by the brake lever 124 for rear blade group on the pin 122, lever 121, and driving lever 114 for rear blade group so that a brake is applied. In the position where the abutting surface 124b is in contact with the brake stopper 126 for rear blade group, the pin 122, lever 121, and driving lever 114 for rear blade group are suspended. Thus the traveling operation of the rear blade group terminates, and at the same time, an exposure is completed. At this juncture, the rear blade group 147 is allowed to spread and cover the aperture 101a. Also, in this respect, the front blade group 146 and the rear blade group 147 are driven with a time differential so that a given period of exposure can be obtained. FIGS. 5A and 5B illustrate the state where the exposure is completed. From this state shown in FIGS. 5A and 5B, a charging operation is performed by a charge mechanism (not shown). At first, the lever 140 for returning operation suspension is reset by the biasing force of the spring 142 to a position where it abuts upon the pin 143.

Then the driving lever 103 for rear blade group rotates in the counterclockwise direction by overcoming the biasing force of the spring 106. When the stopper 103a arrives at a position where it can engage with the stopper 107a, the key 107 for front blade group suspension is reset by the biasing force of the spring 109 to a position where it abuts upon the pin 110. Thus the stopper 103a is allowed to engage with stopper 107a, and further, the brake lever 111 for front blade group is caused to rotate in the clockwise direction to reset it in the state shown in FIGS. 2A and 2B.

Further, the driving lever 114 for rear blade group rotates in the counterclockwise direction by overcoming the biasing force of the driving spring 116 for rear blade group. When the abutting portion 114a arrives at a position where it can engage with the stopper 117a, the key 117 for rear blade group suspension is reset by the biasing force of the spring 119 to the position where it abuts upon the pin 120. Hence the abutting portion 114a is allowed to engage with the stopper 117a. At this juncture, the lever 121 for rear blade group also rotates in the counterclockwise direction integrally with the driving lever 114 for rear blade group along the rotation of the driving lever 114 for rear blade group. However, once the abutting portion 121a engages with the stopper 140a, the lever 121 for rear blade group remains in such position, and together with the driving spring 116 for rear blade group, the spring 123 for rear blade group returning operation is charged by the rotation of the driving lever 114 for rear blade group. Also, the brake lever 124 for rear blade group rotates in the clockwise direction to reset it in the state shown in FIGS. 2A and 2B.

In continuation, the lever 131 for balancer travel rotates in the clockwise direction. When the stopper 131a arrives at a position where it can engage with the stopper 136a, the suspension lever 136 for balancer travel is reset by the biasing force of the spring 138 to the position where it abuts upon the pin 139, thus allowing the stopper 131a to engage with the stopper 136a. At this juncture, the lever 130 for balancer returning operation rotates in the clockwise direction integrally with the lever 131 for balancer travel along the rotation of the lever 131 for balancer travel, but the lever 130 for balancer returning operation remains in the position where the stopper 130a engages with the stopper 140b after such engagement takes place, and then, together with the spring 135 for balancer travel, the spring 134 for balancer returning operation is charged by the rotation of the lever 131 for balancer travel. Also, the balancer lever 127 and balancing weight 128 are suspended when the lever 130 for balancer returning operation is suspended. With the charging operation described above, the operational state becomes as shown in FIGS. 2A and 2B.

Now, in conjunction with FIG. 6, the description will be made of the returning operation of the rear blade group 147, the traveling operation of the front blade group 146, and the operations of balancing weight 128 together with the strokes thereof in particular. FIG. 6 is a front view illustrating the gravity shift associated with the returning operation of the rear blade group 147, and the gravity shift associated with the traveling operation of the front blade group 146.

In FIG. 6, when the rear blade group 147 returns, the pin 122 for rear blade group shifts from position A to position B. Also, the gravity of the rear blade group 147 shifts from position GA to position GB. On the other hand, when the front blade group 146 travels, the pin 105 for front blade group shifts from position B' to position C. Also, the gravity of the front blade group 146 shifts from position GB' to position GC. Here, the pin 122 for rear blade group is positioned at D in FIG. 5A where the traveling operation of the rear blade group 147 is terminated. The stroke between B and D of the pin 122 for rear blade group becomes equal to the stroke between B' and C of the pin 105 for front blade group. Therefore, the stroke between A and B is shorter than the stroke between B' and C. Thus the distance (GA to GB) of the gravity shift when the rear blade group 147 returns is shorter than the distance (GB' to GC) of the gravity shift when the front blade group 146 travels.

FIG. 7 is a front view illustrating the gravity shift of the balancing weight 128 when the rear blade group 147 returns and the front blade group 146 travels. In FIG. 7, when the rear blade group 147 returns, the gravity of the balancing weight 128 shifts from position A to position B in the direction opposite to the direction of the gravity shift of the rear blade group 147 shown in FIG. 6. On the other hand, when the front blade group 146 travels, the gravity of the balancing weight 128 shifts from position B to position C in the direction opposite to the direction of the gravity shift of front blade group 146 shown in FIG. 6. Here, the distance of gravity shift of the balancing weight 128 is such that the distance (A to B) of the shift in the returning operation of the rear blade group 147 is shorter than the distance (B to C) of the shift in the traveling operation of the front blade group 146.

As described above, the stroke of the balancing weight 128 is set corresponding to the respective strokes of the returning operation of the rear blade group 147 and the traveling operation of the front blade group 146. As a result, it is possible to offset in a well-balanced manner the vibrations generated by both the returning operation of the rear blade group 147 and the traveling operation of the front blade group 146.

Figure 8A:
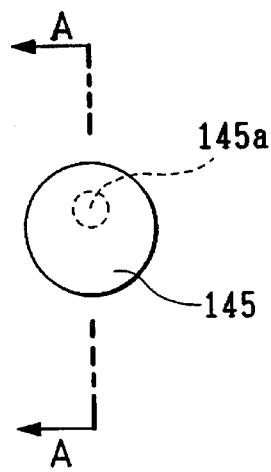
FIG. 8A is a plan view showing a third embodiment of a focal plane shutter device for a camera according to the second invention.
Figure 8B:
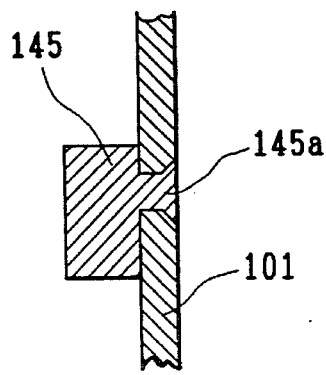
FIG. 8B is a cross-sectional view showing the focal plane shutter device for a camera taken along line A—A in FIG. 8A.
Figure 9:
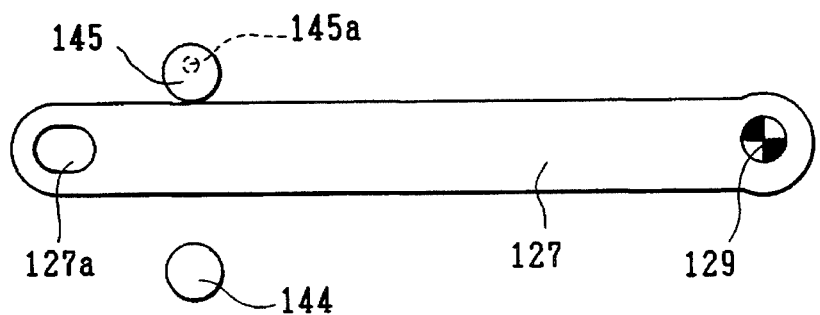
FIG. 9 is a front view showing the third embodiment of the focal plane shutter device according to the second invention.

FIGS. 8A and 8B, and FIG. 9 are views showing a second embodiment according to the second invention, in which the stopper 145 for balancer travel is improved. FIG. 8A is a front view of such embodiment. FIG. 8B is a cross-sectional view taken along line A—A in FIG. 8A. As shown in FIG. 8B, the stopper 145 for balancer travel is mounted on the shutter base 101 by means of a shaft 145a which is eccentrically arranged. The stopper is rotative around the shaft 145a, but the arrangement is made so that it cannot fall off from the shutter base 101. In this respect, an appropriate resistive force is actuated in the rotational direction to make it possible to hold the stopper in an arbitrary position.

FIG. 9 is a front view showing a case where the stopper 145 for balancer travel represented in FIGS. 8A and 8B is applied as a stopper for the balancer lever 127. When the stopper 145 for balancer travel rotates around the shaft 145a, it is possible to change the suspension positions of the balancer lever 127 in the clockwise direction. In other words, the position C shown in FIG. 7 can be changed. Consequently, it becomes possible to simply change the distance of gravity shift for the balancing weight 128 corresponding to the traveling operation of the front blade group only.

Therefore, the stroke distribution of the balancing weight 128 can be easily changed for the returning operation of the rear blade group and the traveling operation of the front blade group, hence making it possible to adjust the irregularity that may exist in the stroke distributions for both of them at the time of fabrication.

As described above, according to the first and second embodiments of the second invention, the distance of the gravity shift for the balancing weight 128 can be set corresponding to both of the strokes for the returning operation of the rear blade group 147 and the traveling operation of the front blade group 146. Therefore, the vibrations generated by both operations can be offset effectively. Further, according to another embodiment, it is possible to adjust the stroke distributions for both returning operation and travel operations.

As set forth above, the second invention has been described according to the first and second embodiments, but according to the technical thought of the second invention, various modifications can be made. For example, in the above-mentioned first and second embodiment, the description has been made on the assumption that the mass is substantially the same for the front and rear blade groups, while the strokes thereof are different. However, in a case where the strokes are the same for the returning operation of the rear blade group and the traveling operation of the front blade group, while the mass is different for the front and rear blade groups, the second invention is also applicable. Further, it may be possible to integrate differences in the strokes of the front and rear blade groups and in the mass thereof for setting so that the vibro-preventive effect can be optimized by the application of the gravity shift.

As described above, according to the second invention, the structure is arranged to differentiate the strokes of the balancer means depending on whether it is interlocked with the returning operation of the rear blade group or with the traveling operation of the front blade group. Therefore, the strokes of the balancer means can be made different corresponding to difference in the moments of shift for the returning operation of the rear blade group and the traveling operation of the front blade group, hence maximizing the prevention of the vibrations associated with the traveling of the rear and front blade groups.

What is claimed is:

1. A focal plane shutter device for camera in which subsequent to a rear movement shading member having been retracted from the photographing image plane by traveling in a first direction from the state where a front movement shading member shades the photographing image plane and the rear movement shading member shades at least a portion of the photographing image plane, the front movement shading member travels in a second direction which is opposite to said first direction to begin exposure, and after a predetermined time has elapsed since then, said rear movement shading member travels in said second direction to complete the exposure, comprising:

balancer means capable of traveling in a third direction which is substantially the same as said second direction and in a fourth direction which is substantially the same as said first direction;

first driving means enabling said balancer means to travel in said third direction substantially at the same time that said rear movement shading member travels in said first direction; and second driving means enabling said balancer means to travel in said fourth direction substantially at the same time that said front movement shading member travels in said second direction.

2. A focal plane shutter device for a camera in which subsequent to a rear movement shading member having been retracted from a photographing image plane by traveling in a first direction from a state where a front movement shading member shades the photographing image plane and the rear movement shading member shades at least a portion of the photographing image plane, the front movement shading member travels in a second direction which is opposite to said first direction to begin exposure, and after a predetermined time has elapsed since then, said rear movement shading member travels in said second direction to complete the exposure, comprising:

balancer means capable of traveling in a third direction which is substantially the same as said second direction;

first driving means enabling said balancer means to travel in said third direction at the same time that said rear movement shading member travels in said first direction;

tensioning means for biasing said rear movement shading member in said first direction in order to cause said rear movement shading member to travel in said first direction;

holding means for holding said rear movement shading member biased by said tensioning means and releasing the holding of said biased rear movement shading member in response to a shutter release; and an assisting member connected with said balancer means to press said rear movement shading member in said first direction to assist said tensioning means while said rear movement shading member is traveling in said first direction.

3. A focal plane shutter device for a camera according to claim 2, wherein said balancer means includes a balancer lever, said first driving means includes a spring, and said assisting member is a swing lever.

4. A focal plane shutter device for a camera according to claim 2, wherein said balancer means is capable of traveling in a fourth direction substantially the same as said first direction, and further comprising second driving means enabling said balancer means to travel in said fourth direction substantially at the same time that said front movement shading member travels in said second direction.

5. A focal plane shutter device for a camera according to claim 4, wherein said second driving means includes a spring and a pin.

6. A focal plane shutter device for a camera structured to return a shading member on a rear traveling side from a state in which a photographing image plane is doubly shaded by said shading member on the rear traveling side and a shading member on a front traveling side to a starting position in order to release the doubly shaded state, to start an exposure subsequently by starting travel of said shading member on the front traveling side; and to terminate the exposure by traveling said shading member on the rear traveling side after the elapse of a given period of time since the start of traveling of said shading member on the front traveling side, comprising:

a returning mechanism for said shading member on the rear traveling side; and balancing means including a balancing weight, wherein interlocked with the returning operation of said shading member on the rear traveling side and the traveling operation of said shading member on the front traveling side, said balancer means is arranged to reciprocate; and a stroke of said balancer means differs depending on whether it is interlocked with the returning operation of said shading member on the rear traveling side or with the traveling operation of said shading member on the front traveling side.

7. A focal plane shutter device for a camera according to claim 6, wherein the stroke of said balancer means at the time of being interlocked with the returning operation of said shading member on the rear traveling side is shorter than the stroke of said balancer means at the time of being interlocked with the traveling operation of said shading member on the front traveling side.

8. A focal plane shutter device for a camera according to claim 6, wherein said balancer means includes a balancer lever capable of swinging reciprocally in a direction of the returning operation of said shading member on the rear traveling side and in a direction of the traveling operation of said shading member on a front traveling side, and the swinging stroke of said balancer lever differs depending on whether it is interlocked with the returning operation of said shading member on the rear traveling side or with the traveling operation of said shading member on the front traveling side.

9. A focal plane shutter device for a camera in which a front movement shading member travels in one direction to begin exposure and a rear movement shading member travels in said one direction after a predetermined time has elapsed since then to complete the exposure, comprising:

balancer means capable of traveling in another direction which is substantially opposite to said one direction;

first driving means enabling said balancer means to travel in said another direction at the same time that said front movement shading member travels in said one direction;

traveling means connected with said balancer means to travel in association with the traveling of said balancer means in said another direction; and chasing means connected with said rear movement shading member to chase said traveling means when said rear movement shading member travels in said one direction;

said chasing means being arranged to secure a space between said front movement shading member and said rear movement shading member by contacting said traveling means in motion.

10. A focal plane shutter device for a camera according to claim 9, and which is of a type in which subsequent to said rear movement shading member having been retracted from the photographing image plane by traveling in a retraction direction which is opposite to said one direction from a state where said rear movement shading member substantially shades the photographing image plane, said front movement shading member travels in said one direction from a state where said front movement shading member shades the photographing image plane, to begin exposure, wherein said balancer means is capable of traveling in a direction which is substantially opposite to said another direction, and further comprising second driving means enabling said balancer means to travel in said direction substantially opposite to said another direction substantially at the same time that said rear movement shading member travels in said retraction direction.

11. A focal plane shutter device for a camera in which subsequent to a rear movement shading member having been retracted from a photographing image plane by traveling in a first direction from a state where the rear movement shading member and a front movement shading member shade the photographing image plane substantially doubly, the front movement shading member travels in a second direction which is opposite to said first direction to begin exposure, and after a predetermined time has elapsed since then, said rear movement shading member travels in said second direction to complete the exposure, comprising:

balancing means being capable of traveling in a third direction which is substantially the same as said second direction and in a fourth direction which is substantially the same as said first direction, wherein when said rear movement shading member travels in said first direction, said balancer means travels in said third direction, and when said front movement shading member travels in said second direction, said balancer means travels in said fourth direction.

12. A focal plane shutter device for a camera in which subsequent to a rear movement shading member having been retracted from a photographing image plane by traveling in a return direction from a state where a front movement shading member and the rear movement shading member shade the photographing image plane substantially doubly, said front movement shading member travels in a direction of a blind movement which is opposite to said return direction to begin exposure, and after a predetermined time has elapsed since then, said rear movement shading member travels in said blind movement direction to complete the exposure, comprising:

a balancer lever capable of traveling in a direction substantially the same as said blind movement direction;

a first driving member enabling said balancer lever to travel in said direction substantially the same as said blind movement direction substantially at the same time that said rear movement shading member travels in said return direction;

a tensioning member biasing said rear movement shading member in said return direction in order to cause said rear movement shading member to travel in said return direction;

a return holding lever holding said rear movement shading member biased by said tensioning member and releasing the holding of said biased rear movement shading member in response to a shutter release; and a swing lever connected with said balancer lever to press said rear movement shading member in said return direction to assist said tensioning member substantially at the same time that said rear movement shading member travels in said return direction.

13. A focal plane shutter device for a camera according to claim 12, wherein said balancer lever is capable of traveling in a direction substantially the same as said return direction, and further comprising a second driving member causing said balancer lever to travel in said direction substantially the same as said return direction substantially at the same time that said front movement shading member travels in said blind movement direction.

14. A focal plane shutter device for a camera in which a front movement shading member travels in a direction of a blind movement to begin exposure, and after a predetermined time has elapsed since then, a rear movement shading member travels in said blind movement direction to complete the exposure, comprising:

a balancer lever being capable of traveling in a direction which is substantially opposite to said blind movement direction;

a first driving member enabling said balancer lever to travel in said direction substantially opposite to said blind movement direction substantially at the same time that said front movement shading member travels in said blind movement direction;

a swing lever connected with said balancer lever to travel when said balancer lever travels in said direction substantially opposite to said blind movement direction; and a return lever connected with said rear movement shading member and chasing said swing lever when said rear movement shading member travels in said blind movement direction, said return lever being arranged to secure an exposure space between said front movement shading member and said rear movement shading member by contacting said swing lever in motion.

15. A focal plane shutter device for a camera according to claim 14, and which is of a type in which subsequent to said rear movement shading member having been retracted from a photographing image plane by traveling in a return direction which is opposite to said blind movement direction from a state where said rear movement shading member substantially shades the photographing image plane, said front movement shading member travels in said blind movement direction from a state where said front movement shading member shades the photographing image plane to begin exposure, wherein said balancer lever is capable of traveling in a direction substantially the same as said blind movement direction, and further comprising second driving means enabling said balancer lever to travel in said direction substantially the same as blind movement direction substantially at the same time that said rear movement shading member travels in said return direction.

16. A focal plane shutter device for a camera in which subsequent to a rear movement shading member having been retracted from a photographing image plane by traveling in a return direction from a state where a front movement shading member shades the photographing image plane and said rear movement shading member shades at least a portion of the photographing image plane, said front movement shading member travels in a blind movement direction which is opposite to said return direction to begin exposure, and after a predetermined time has elapsed since then, said rear movement shading member travels in said blind movement direction to complete the exposure, comprising:

a balancer lever which travels in a direction substantially the same as said blind movement direction substantially at the same time that said rear movement shading member travels in said return direction, and which travels in a direction substantially the same as said return direction substantially at the same time that said front movement shading member travels in said blind movement direction.

17. A focal plane shutter device for a camera in which subsequent to a rear movement shading member having been retracted from a photographing image plane by traveling in a return direction from a state where a front movement shading member shades the photographing image plane and the rear movement shading member shades at least a portion of the photographing image plane, said front movement shading member travels in a blind movement direction which is opposite to said return direction to begin exposure, and after a predetermined time has elapsed since then, said rear movement shading member travels in said blind movement direction to complete the exposure, comprising:

a balancer lever capable of traveling in substantially said blind movement direction and in substantially said return direction;

a first driving member enabling said balancer lever to travel in substantially said blind movement direction substantially at the same time that said rear movement shading member travels in said return direction;

a swing lever connected with said balancer lever and capable of traveling in substantially said blind movement direction and in substantially said return direction; and a return lever connected with said rear movement shading member and chasing said swing lever when said rear movement shading member travels in said blind movement direction;

wherein said swing lever is arranged to press said rear movement shading member in said return direction when said rear movement shading member travels in said return direction, and to secure, by contacting said return lever in motion, an exposure space between said front movement shading member and said rear movement shading member when said rear movement shading member travels in said blind movement direction.

18. A focal plane shutter device for a camera structured to return a shading member on a rear traveling side from a state in which a photographing image plane is doubly shaded by said shading member on the rear traveling side and a shading member on a front traveling side to a starting position in order to release the doubly shaded state, to start an exposure subsequently by starting travel of the shading member on the front traveling side, and to terminate the exposure by traveling said shading member on the rear traveling side after the elapse of a given period of time since the start of traveling of said shading member on the front traveling side, comprising:

a returning mechanism for said shading member on the rear traveling side; and a balancer which includes a balancing weight, wherein interlocked with the returning operation of said shading member on the rear traveling side and the traveling operation of said shading member on the front traveling side, said balancer is arranged to reciprocate; and a stroke of said balancer differs depending on whether it is interlocked with the returning operation of said shading member on the rear traveling side or with the traveling operation of said shading member on the front traveling side.

19. A focal plane shutter device for a camera in which subsequent to a rear movement shading member having been retracted from a photographing image plane by traveling in a first direction from a state where a front movement shading member shades the photographing image plane and the rear movement shading member shades at least a portion of the photographing image plane, the front movement shading member travels in a second direction which is opposite to said first direction to begin exposure, and after a predetermined time has elapsed since then, said rear movement shading member travels in said second direction to complete the exposure, comprising:

a balancer capable of traveling in a third direction which is substantially the same as said second direction and in a fourth direction which is substantially the same as said first direction; and a drive system which enables said balancer to travel in said third direction substantially at the same time that said rear movement shading member travels in said first direction and which enables said balancer to travel in said fourth direction substantially at the same time that said front movement shading member travels in said second direction.

* * * * *